United States Patent [19]

Tsuchida et al.

[11] 3,830,661

[45] Aug. 20, 1974

[54] PROCESS FOR PREPARATION OF CATHODE MIX FOR ALKALINE CELL

[75] Inventors: Takashi Tsuchida, Shizuoka-ken; Kenichi Shinoda, Aichi-ken; Kohei Yamamoto, Shizuoka-ken; Noriaki Sakamoto, Shizuoka-ken; Mastatake Nishio, Shizuoka-ken, all of Japan

[73] Assignee: Fuji Electrochemical Co. Ltd., Tokyo, Japan

[22] Filed: Apr. 5, 1973

[21] Appl. No.: 348,339

[30] Foreign Application Priority Data

Oct. 28, 1972 Japan .............................. 47-108363

[52] U.S. Cl. ................ 136/120 R, 136/33, 136/139

[51] Int. Cl. .......................................... H01m 13/08

[58] Field of Search .................... 136/139, 136-138, 136/123-124, 107, 120 R, 75, 21, 33; 34/10

[56] References Cited

UNITED STATES PATENTS

| | | | |
|---|---|---|---|
| 1,331,213 | 2/1920 | Ruhoff | 136/139 |
| 2,154,000 | 4/1939 | Zizina et al. | 34/10 X |
| 2,772,321 | 11/1956 | Ensign | 136/120 R |

*Primary Examiner*—Anthony Skapars
*Attorney, Agent, or Firm*—Eliot S. Gerber

[57] ABSTRACT

A process for the preparation of a cathode mix for an alkaline cell, which comprises forming a slurry by adding water and a binder to a powder of a depolarizer and a powder of an electrically conductive substance and kneading them, spray-drying the slurry to form particles, and molding the particles into a cathode mix.

4 Claims, No Drawings

PROCESS FOR PREPARATION OF CATHODE MIX FOR ALKALINE CELL

DISCLOSURE

A cathode mix for conventional Leclanché cells is usually prepared by a molding method adopting a relatively low molding pressure such as 10 to 20 Kg/cm², because the starting material is made to contain 14 to 20 wt. percent of water based on the resulting cathode mix on account of characteristic properties of the cells.

In contrast, in the case of an alkaline cell containing an alkaline aqueous solution as an electrolyte, such as a mercury cell, a silver cell or an alkaline-manganese cell, a cathode mix is prepared by molding the starting material having a water content of up to 4 wt. percent under such a high pressure as 1 to 5 tons per square centimeter. Accordingly, the form of the starting powder and the molding method are quite different from those adopted in the preparation of a cathode mix for a Leclanché cell.

A mixture of mercury oxide and graphite is usually employed for formation of a cathode mix for a mercury cell, and a mixture of manganese dioxide and graphite is generally used for formation of a cathode mix for an alkaline-manganese cell. However, such starting material of the state as mixed takes a form of powder very poor in fluidity and a high molding efficiency cannot be attained with use of such powdery starting material. When such powdery starting material is molded to particles having a suitable size, the fluidity can be improved and the molding efficiency can be heightened.

By way of example, the preparation of a cathode mix for an alkaline-manganese cell will now be described. A method comprising dry-mixing powders of manganese dioxide and graphite, adding to the mixture a potassium hydroxide aqueous solution, kneading them to form a mixture of the granular powder form and molding it by packing it into a suitable mold has been known. In this method, however, the resulting granular powder is in the state wetted with an alkaline aqueous solution having a water-absorbing property, and therefore, it is very difficult to store it in good conditions. Further, bridges are formed among particles or granules of the powder, resulting in degradation of the fluidity. Therefore, it is very difficult to supply the powder into a molding machine or pack it into a mold smoothly in good canditions, and such powder is not suitable for the mass production using an automatic powder molding machine. Another method conducted from the past comprises dry-mixing powders of manganese dioxide and graphite, adding to the mixture a binder such as an aqueous solution of carboxymethyl cellulose, kneading the mixture to form a granular powder in the considerably wet state, drying it under heating, sifting the dried product to adjust the grain size, and molding the sifted powder into a cathode mix. This method requires a drier of a great dimension, and in case the wet granular powder is dried in a layer state, the degree of drying is different between the upper and lower portions of the layer. Accordingly, the resulting dried granular powder is not uniform in respect to the water content. Moreover, the resulting dried particles or granules are readily finely divided during the sifting step, and the sifted product is not uniform in respect to the particle size, with the result that the state of the powder is likely to become non-uniform when it is packed in a mold and dispersion is readily brought about in the amount packed. Therefore, the molding rate cannot be enhanced and dispersion in the battery characteristics of the final cell is frequently caused to occur.

It is therefore a primary object of this invention to provide a process for the preparation of a cathode mix for an alkaline cell, according to which the granular powder can be packed uniformly in a mold and the battery characteristics of the resulting cell can be improved greatly.

Another object of this invention is to provide a process for the preparation of a cathode mix for an alkaline cell, according to which a granular powder can be packed uniformly in a mold and the molding rate can be enhanced.

A still further object of this invention is to provide a process for the preparation of a granular powder for molding a cathode mix of an alkaline cell, which is excellent in the fluidity and hence, has a good moldability.

In accordance with the process of this invention for the preparation of a cathode mix for an alkaline cell, water and binder is added to a mixture formed by dry-mixing a powder of a depolarizer and a powder imparting an electric conductivity thereto, and the mixture is kneaded to form a slurry paste. Then, this slurry paste is sprayed in a drying chamber maintained at a prescribed temperature to effect the spray-drying and obtain dried particles having a narrow particle size distribution range and being considerably uniformalized in the particle size. Then, such dried particles are molded according to the conventional techniques and a cathode mix intended in this invention can be obtained.

Known depolarizers and electrically conductive substances can be used in this invention. For instance, manganese dioxide, nickel oxide, mercury oxide and silver oxide may be used as a depolarizer, and graphite, acetylene black and the like may be used as an electrically conductive substnace.

Any of binders heretofore used for formation of a cathode mix, such as carboxymethyl cellulose, hydroxypropyl cellulose, polyvinyl alcohol and sodium polyacrylate can be used as a binder in this invention.

In the spray-drying step, the starting slurry paste is pulverized by a method comprising projecting the starting slurry paste in the finely divided state from nozzles under pressure into a drying chamber or a method comprising feeding the starting slurry paste on a disc rotating at a high speed and dispersing it into a drying chamber by utilizing a centrifugal force, and the resulting particles are contacted with a current of hot air in a counter-current or parallel-current manner in the drying chamber. It is necessary that the spray-drying is carried out at such a temperature as will not cause degradation of components contained in the starting slurry paste, such as the depolarizer and binder. This temperature varies depending on the kinds of the starting raw materials. For instance, in the case of manganese dioxide, it is preferred that the spray-drying is carried out at a temperature approximately 100° C.

It has been found that the pH of the slurry paste formed by kneading the depolarizer, the conductor powder, the binder and water has great influences on the particle size of dried particles obtained by the spray-drying. Because of the characteristic properties of the depolarizer and conductor, the slurry paste is sometimes caused to have a pH in an acidic region, namely a pH of about 5. In case the pH of the slurry paste is in an acidic region, the activity of the binder contained in the slurry paste is lowered, and therefore, the resulting dried particles have a broad particle size distribution range and it is impossible to obtain particles uniform in the particle size, with the result that the moldability is lowered in the step of molding a cathode mix. Further, alkaline cells prepared with use of cathode mixes formed by employing such non-uniform particles exhibit a great dispersion in the properties thereof. Accordingly, in case the formed slurry has a pH in acidic region, it is preferred that the slurry is neutralized or made alkaline by addition of potassium hydroxide or sodium hydroxide.

This invention will now be illustrated by reference to Examples, but these Examples are not to limit this invention but include various modifications within the scope of this invention.

EXAMPLE 1

A slurry was prepared by kneading the following components:

| | |
|---|---|
| manganese dioxide (powdery electrolyzed product) | 700 parts by weight |
| graphite (powdery) | 100 parts by weight |
| hydroxypropyl cellulose | 3.2 parts by weight |
| water | 480 parts by weight |

The so formed slurry was projected from nozzles under a pressure of 18 $Kg/cm^2$, and sprayed in the finely pulverized state into a drying chamber maintained at about 100° C. and thus dried. The dried particles were with-drawn from the lower portion of the drying chamber and the particle size thereof was measured. As a result, it was found that the particle size distribution range was from 60 to 150$\mu$ and an average particle size was 100$\mu$. Thus, there were obtained spherical particles almost uniform in the particle size. The water content of the particles was found to be 1.8 wt. percent.

The fluidity of the particles was determined by the "Method for Determination of Flow Rate of Metal Powders" specified in JIS Z-2502. More specifically, a powder flowmeter composed of a funnel of a conical angle of 60° provided with an orifice of 2.63 mm in the diameter and 3.2 mm in the depth at the bottom portion thereof was employed for the determination. The dried particles were allowed to fall down naturally from the orifice mounted on the bottom of the funnel, and the time required for completion of falling was measured. The sample dried particles to be tested were obtained by maintaining the above obtained particles at 105° ± 5° C. for 1 hour and lowering the temperature of the particles to room temperature in a desiccator. Then, 50 g of the cooled particles were collected as a sample, and after sealing of the orifice of the funnel, the so collected sample particles were charged in the funnel. Then, the bottom of the orifice was opened and the particles were allowed to fall down. The period of time from the opening of the orifice bottom to completion of falling of particles was measured. As a result, in the particles obtained in this Example, this time was 103 seconds.

Then, the particles were molded under a molding pressure of smoothly 3 tons per square centimeter by employing a powder molding machine. The particles were packed in a mold smooth,y in good conditions and the packed amount was uniform. The resulting cathode mix was very smooth and hard.

EXAMPLE 2

A slurry was prepared by kneading the following components:

| | |
|---|---|
| manganese dioxide (powdery electrolyzed product) | 300 parts by weight |
| graphite (powdery) | 100 parts by weight |
| carboxymethyl cellulose | 1.5 parts by weight |
| water | 280 parts by weight |

The pH of the resulting slurry was 5.0. The slurry was spray-dried as it was without the pH adjustment in the same manner as in Example 1 to obtain spherical dried particles. The average particle size, the particle size distribution range and the fluidity of the so formed particles were as shown in the Table given below.

A cathode mix was prepared by molding the resulting dried particles in the same manner as in Example 1. With use of the so prepared cathode mix, an alkaline-manganese cell of the D size was constructed. At this time, the anode was prepared by kneading zinc powder with carboxymethyl cellulose and dispersing the kneaded mixture into an aqueous solution of potassium hydroxide. Battery characteristics just after the preparation were determined at 20° C., and average values obtained with respect to 10 samples are shown in the Table. The discharge characteristics are expressed in terms of the time required for the voltage to reach 0.9 V.

Separately, for comparision, a kneaded mixture was prepared from the same composition as above except that the amount of water was changed to 60 parts by weight, and it was dried according to the conventional technique without conducting the abovementioned spray-drying, to obtain dried particles. More specifically, the kneaded mixture was expanded in a thickness of 3 cm on a stainless steel plate and dried for 4 hours in a drier maintained at 80° C. Then, the dried product was sifted with use of a 60-mesh sieve.

The so formed dried particles was molded in the same manner as above to prepare a cathode mix. With use of this cathode mix, an alkaline-manganese cell of the D size was constructed in the same manner as above. Results of the measurement of the battery characteristics of the so constructed cell are shown in the Table.

As is seen from the results shown in the Table, the dried particles obtained by the spray-drying were excellent over the dried particles obtained by the conventional method with respect to the particle size uniformity and the fluidity. Accordingly, during the cathode mix molding step, they could be packed in a mold very smoothly in good conditions, and the molding rate could be heightened two to three times as compared with the case of the conventional method.

The battery characteristics of the cell constructed with use of the cathode mix prepared in this invention were excellent over those of the cell constructed with use of the cathode mix prepared by the conventional method, and there was observed a significant difference between them.

EXAMPLE 3

The slurry of a pH of 5.0 obtained in Example 2 was treated with 48 wt. percent KOH aqueous solution to adjust the pH to 8.0. Then, the slurry was spray-dried in the same manner as in Example 2 and the resulting dried particles were molded into a cathode mix, and an alkaline-manganese cell of the D size was constructed with use of the so formed cathode mix. Results of the measurement of the battery characteristics are shown in the Table.

As is apparent from the results shown in the Table, when the pH adjustment is conducted, since the activity of the binder is not lowered, the particle size distribution range is further limited as compared with the case where the pH adjustment is not effected. Thus, particles more uniform in the particle size can be obtained when the pH adjustment is effected, resulting in improvement of the battery characteristics.

Table

| | Example 2 | | Example 3 |
|---|---|---|---|
| | Comparative Product | Product of This Invention | |
| Average Particle Size | 80μ | 100μ | 100μ |
| Particle Size Range | 20 – 250μ | 60 – 150μ | 80 – 130μ |
| Fluidity (time required for falling) | 123 seconds | 105 seconds | 88 seconds |
| Battery Characteristics | | | |
| off-load voltage | 1.51 V | 1.52 V | 1.53 V |
| flash current | 7.0±5.0A | 7.3±4.5A | 13.0±4.1A |
| 2Ω continuous discharge | 9.5±1.5 hours | 10.2±1.0 hours | 10.6±0.4 hours |
| 2Ω continuous discharge | 143±17.5 hours | 150±15.8 hours | 170±6.1 hours |

What is claimed is:

1. A process for the preparation of a cathode mix for an alkaline cell, which comprises forming a slurry by adding water and a binder to a powder of a depolarizer and a powder of an electrically conductive substance and kneading them, spray-drying the slurry to form particles, and molding the particles into a cathode mix.

2. A process according to claim 1 wherein manganese dioxide is used as the depolarizer, graphite is used as the electrically conductive substance powder and hydroxypropyl cellulose is used as the binder, and the spray-drying is carried out at about 100° C.

3. A process for the preparation of a cathode mix for an alkaline cell, which comprises forming a slurry by adding water and a binder to a powder of a depolarizer and a powder of an electrically conductive substance and kneading them, adjusting the pH of the slurry within a neutral or alkaline range, spray-drying the slurry to form particles, and molding the particles into a cathode mix.

4. A process according to claim 3 wherein manganese dioxide is used as the depolarizer, graphite is used as the electrically conductive substance powder and carboxymethyl cellulose is used as the binder, and the spray-drying is carried out at about 100° C.

* * * * *